United States Patent
Lindner et al.

(10) Patent No.: US 9,522,596 B2
(45) Date of Patent: Dec. 20, 2016

(54) VEHICLE WITH A SELECTOR DEVICE FOR SELECTING DIFFERENT STATES OF A TRANSMISSION

(71) Applicant: Bayerische Motoren Werke Aktiengesellschaft, Munich (DE)

(72) Inventors: Matthias Lindner, Graefelfing (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 547 days.

(21) Appl. No.: 13/914,783

(22) Filed: Jun. 11, 2013

(65) Prior Publication Data

US 2013/0269464 A1    Oct. 17, 2013

Related U.S. Application Data

(63) Continuation of application No. PCT/EP2012/000148, filed on Jan. 14, 2012.

(30) Foreign Application Priority Data

Feb. 18, 2011  (DE) .................. 10 2011 004 389

(51) Int. Cl.
  *F16H 19/00*   (2006.01)
  *B60K 20/06*   (2006.01)
  (Continued)

(52) U.S. Cl.
  CPC ............. *B60K 20/06* (2013.01); *F16H 59/105* (2013.01); *F16H 63/42* (2013.01); *Y10T 74/20146* (2015.01)

(58) Field of Classification Search
  CPC .. Y10T 74/20146; B60K 20/06; F16H 59/105; F16H 63/42
  See application file for complete search history.

(56) References Cited

U.S. PATENT DOCUMENTS 6,945,377 B2 * 9/2005 Burr ...................... F16H 59/105
                                                 192/220.2
6,948,399 B2 * 9/2005 Yoshikawa ............ B60K 20/06
                                                 74/473.12

(Continued)

FOREIGN PATENT DOCUMENTS

| CN | 101223054 A | 7/2008 |
| CN | 101627232 A | 1/2010 |

(Continued)

OTHER PUBLICATIONS

Chinese Office Action dated May 12, 2015, with English translation (fifteen (15) pages).

(Continued)

*Primary Examiner* — David M Fenstermacher
(74) *Attorney, Agent, or Firm* — Crowell & Moring LLP

(57) ABSTRACT

A vehicle is provided with a steering wheel which is rotatable about a steering axis, a transmission, and a manually actuable selector device. The selector device is provided for selecting different states of the transmission, is arranged at a distance from the steering wheel on a side of the latter which faces away from a driver, and has a selector element which is rotatable or pivotable about an axis of rotation or pivot axis which is substantially transverse to the steering axis.

20 Claims, 2 Drawing Sheets

(51) Int. Cl.
*F16H 59/10* (2006.01)
*F16H 63/42* (2006.01)

(56) References Cited

U.S. PATENT DOCUMENTS

| | | | | |
|---|---|---|---|---|
| 7,131,347 | B2* | 11/2006 | Yoshikawa | B60K 20/06 74/473.12 |
| 7,597,021 | B2* | 10/2009 | Nishio | F16H 59/0204 74/473.12 |
| 8,246,518 | B2* | 8/2012 | Trevino | F16H 61/32 477/125 |
| 8,600,635 | B2* | 12/2013 | Wakita | F16H 59/0204 477/116 |
| 8,814,752 | B2* | 8/2014 | Kitaori | F16H 63/3466 477/99 |
| 9,041,526 | B2* | 5/2015 | Nishimura | B60Q 1/42 200/61.31 |
| 2004/0110600 | A1 | 6/2004 | Sekino et al. | |
| 2009/0321229 | A1 | 12/2009 | Haug | |
| 2010/0056331 | A1 | 3/2010 | Johansson et al. | |
| 2011/0036194 | A1 | 2/2011 | Ishihara et al. | |

FOREIGN PATENT DOCUMENTS

| | | |
|---|---|---|
| DE | 20 2004 019 677 U1 | 4/2005 |
| DE | 602 04 259 T2 | 8/2006 |
| DE | 10 2007 036 086 A1 | 2/2009 |
| EP | 0 432 507 A2 | 6/1991 |
| EP | 0 444 676 A1 | 9/1991 |
| EP | 1 255 064 A2 | 11/2002 |
| GB | 2 399 606 A | 9/2004 |
| JP | 2008-37297 A | 2/2008 |
| JP | 2008-44540 A | 2/2008 |
| WO | WO 2007/006607 A1 | 1/2007 |

OTHER PUBLICATIONS

German-language Examination Report dated Jan. 4, 2012 with English Translation (Nine (9) pages).

International Search Report dated Mar. 2, 2012 with English Translation (Six (6) pages).

English translation of Chinese Office Action dated Sep. 2, 2014 (eight (8) pages).

* cited by examiner

VEHICLE WITH A SELECTOR DEVICE FOR SELECTING DIFFERENT STATES OF A TRANSMISSION

CROSS REFERENCE TO RELATED APPLICATIONS

This application is a continuation of PCT International Application No. PCT/EP2012/000148, filed Jan. 14, 2012, which claims priority under 35 U.S.C. §119 from German Patent Application No. DE 10 2011 004 389.6, filed Feb. 18, 2011, the entire disclosures of which are herein expressly incorporated by reference.

This application contains subject matter related to U.S. application Ser. No. 13/914,771, entitled "A Vehicle Having a Gearbox and a Manually Operated Selector Device," filed on Jun. 11, 2013.

BACKGROUND AND SUMMARY OF THE INVENTION

The present invention relates to a vehicle having a steering wheel, which is rotatable about a steering axis, a transmission, and a manually actuable selector device, which is provided for selecting different states of the transmission.

In the case of BMW 7-Series vehicles, which have been sold since the year 2002, a steering-column-type selector lever was provided for selecting the individual operating states—Drive (D), Neutral (N) and Reverse (R). In the case of these vehicles, the selector lever is arranged on a side of the steering wheel facing away from the driver and spaced away from the steering wheel. The selector lever is provided as a monostable selector lever; i.e. it automatically returns into its starting position after an actuation. In order to shift from the momentary operating state (P, R, N, D) into another operating state, the selector lever has to be pivoted from its inoperative position about a pivot axis which is parallel or coaxial with respect to the steering axis of the steering wheel.

It is an object of the invention to provide a vehicle with a selector device for selecting different operating states of a transmission, whereby the selector device can be operated in a comfortable and more intuitive manner.

This and other objects are achieved by a vehicle having a steering wheel, which is rotatable about a steering axis, a transmission, and a manually actuable selector device, which is provided for selecting different states of the transmission. The selector device is arranged at a distance from the steering wheel on a side of the latter which faces away from the driver and has a selector element which is rotatable or pivotable about an axis of rotation or a pivot axis, wherein the axis of rotation or pivot axis is essentially transverse to the steering axis. Advantageous embodiments and further developments of the invention are described and claimed herein.

The starting point of the invention is a vehicle with a steering wheel, which is rotatable about a steering axis, a transmission and a manually actuable selector device which is provided for selecting different states of the transmission. The selector device is arranged on a side of the steering wheel facing away from the driver and at a distance from the steering wheel. It has a selector element that is rotatably or pivotably arranged about an axis of rotation or a pivot axis.

According to the invention, the axis of rotation or pivot axis is essentially transverse to the steering axis. The "degree of freedom of motion" of the selector element according to the invention is therefore transverse to the selector lever to be found in the case of the above-mentioned BMW 7-Series.

The term "states of the transmission" comprises, in particular, the customary operating states of an automatic transmission, specifically "drive" (D), "neutral" (N) and "reverse" (R). If the vehicle transmission "initiated by the driver" can be shifted from one transmission gear to another transmission gear, the term "states of the transmission" will also comprise the "manual" engaging of individual gears, particularly manual step-by-step shifting from one transmission gear into a next higher or next lower transmission gear.

The invention is particularly suitable for so-called "shift-by-wire" shifting systems, i.e. for shifting devices in which the selector device or the selector element is electrically coupled with a transmission control device or with a transmission.

According to a further development of the invention, the selector element is arranged to be rotatable or pivotable into a first direction and into a second direction opposite to the first direction, specifically about the above-mentioned axis of rotation or pivot axis. Viewed in the traveling direction of the vehicle, the selector element may be arranged on the right-hand side of the steering axis; i.e. in an angular area in which the "windshield wiper lever" is normally arranged in the case of conventional vehicles. The selector device or the selector element may optionally be arranged below or above a horizontal plane which can be imagined to cut the steering wheel in half. In a top view of the steering wheel from the driver's viewpoint, the selector device or the selector element is preferably arranged in the upper right steering wheel quadrant.

In order to ensure an optimal accessibility of the selector element during the drive, it may be provided that, viewed in the radial direction of the steering wheel, the selector element projects slightly beyond a steering wheel rim of the steering wheel.

According to a further development of the invention, it is provided that the selector element is rotatably or pivotably arranged on a "selector element holder", which essentially projects radially from a steering column covering surrounding the steering axis toward the outside. The selector element holder may be arranged to be fixed to the vehicle. This means that, in contrast to a window wiper lever or direction signal lever, the selector element holder cannot be moved relative to the steering column covering.

The selector element may have various constructions, for example, as a ratchet-type selector element or as a selector ring, etc. The selector element preferably has a "thickened section" and an operating section projecting radially with respect to the axis of rotation or pivot axis of the selector element and having operating surfaces. The operating section is that area that is gripped by the driver for actuating the selector device. The operating section may, for example, have a front side and a back side. By way of assigned operating surfaces of the front or back side, the driver can press the selector element toward the front in the traveling direction or can pull it toward the rear against the traveling direction.

It may be provided that the operating section for selecting the operating state D is to be rotated or pivoted in the traveling direction of the vehicle, and for selecting the operating state R, is to be rotated or pivoted against the traveling direction.

According to a further development of the invention, a display device is provided on the selector element holder for displaying the currently selected operating state. The display device can be constructionally integrated in the selector element holder or in the operating section. The display device may be formed by a display, by legends with assigned light elements (such as LEDs), or the like. In addition to the individual operating states of the transmission (R, N, D), it may also be provided that it is displayed whether the transmission is currently in the parked state (P).

In particular, the selector device may be a so-called monostable selector device. A monostable selector device is a selector device that has a restoring device which moves the selector device or the concerned selector element after an actuation in each case back into a predefined inoperative position.

The selector device is preferably designed and laid out such that it can be actuated by finger, particularly by means of only one finger.

It may be provided that the selector device or its selector element, starting from the inoperative position, can be moved against a restoring force into a first actuating position and, starting out from the first actuating position, further against a restoring force into a second actuating position. Furthermore, a pressure point may be provided which has to be overcome during the transition from the first actuating position to the second actuating position.

According to a further development of the invention, a sensor device is provided which detects the rotating or pivoting state, particularly the rotating or pivoting angle of the selector element with respect to the inoperative position and supplies a corresponding signal to the transmission control device. For sensing the rotating or pivoting state, a visual sensor may, for example, be provided.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
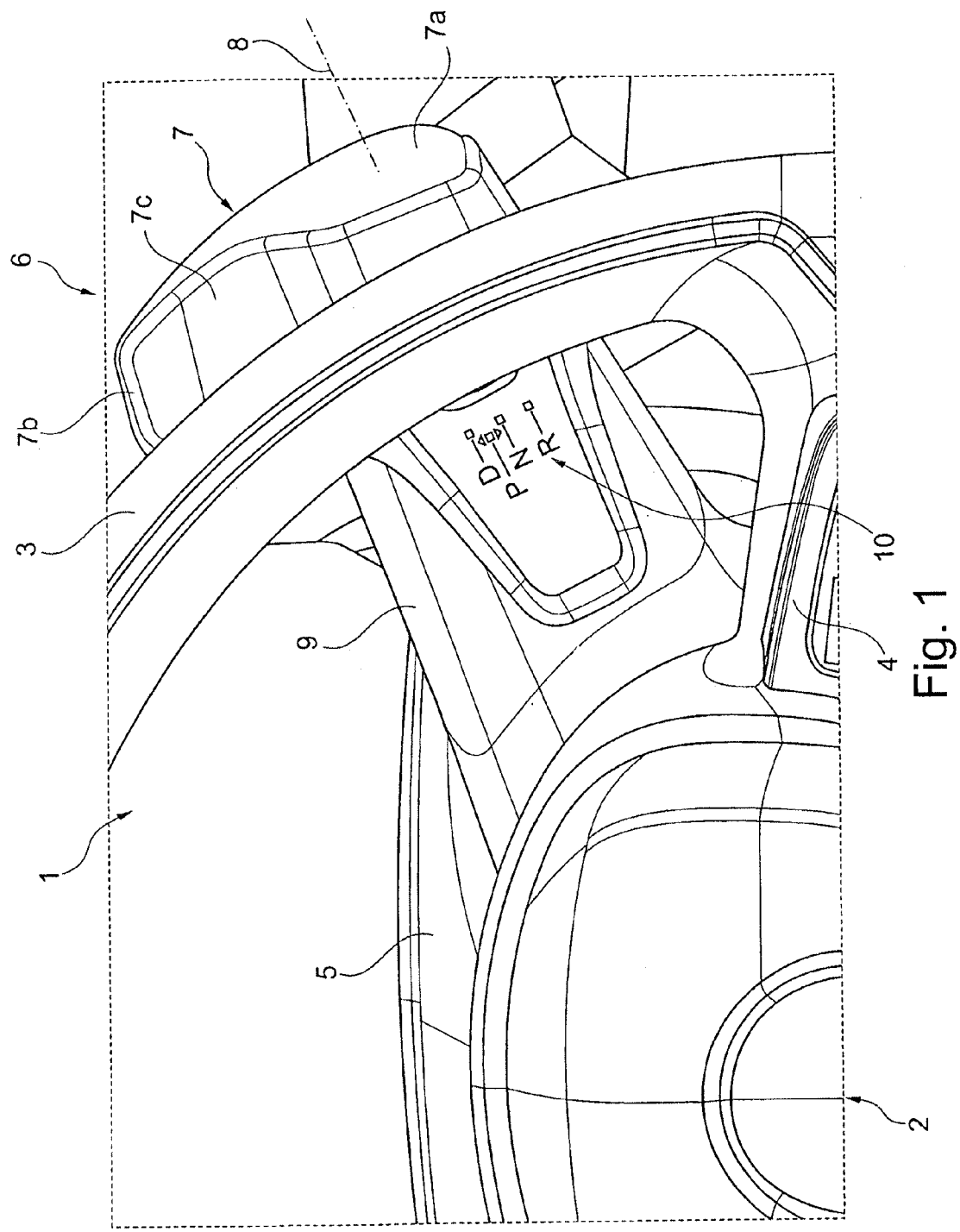
FIG. 1 is a view of the basic principle of a selector device according to an embodiment of the invention.

FIG. 1 is a view of a cutout of a steering wheel 1 of a vehicle. The steering wheel 1 can be rotated about an axis 2 of rotation extending perpendicular or essentially perpendicular to the plane of projection. The steering wheel 1 has a steering wheel rim 3 which is connected with the steering axis 2 by way of several steering wheel spokes, of which here only one—the steering wheel spoke 4—is partially visible. The steering axis 2 is covered by a steering column covering 5.

On a side of the steering wheel 1 facing away from the driver and spaced apart from the steering wheel 1, a selector device 6 is arranged. The selector device 6 has a selector element 7 which is pivotably arranged about an axis of rotation or pivot axis 8, which is essentially transverse to the steering axis 2. The selector element 7 is rotatably or pivotably arranged on a selector element holder 9, which is fixed on the vehicle and which—from the driver's viewpoint—extends essentially radially from the steering column covering 5 to the right top on the outside, specifically in the manner of a "steering column lever". However, in contrast to the steering column lever, the selector element holder 9, as mentioned above, is not arranged to be movable but is fixed to the vehicle.

The selector element 7 has a thickened section 7a and an operating section 7b projecting radially with respect to the axis of rotation or pivot axis 8 from the thickened section 7a. The front side 7c of the operating section 7b, which faces the driver and the back side not facing the driver (not visible) of the operating section 7b form operating surfaces which the driver touches when actuating the selector element.

As illustrated in FIG. 1, a display device 10 is integrated in the selector element holder 9, which display device 10 indicates the current operating state (drive, neutral, reverse, parking) of the transmission.

Figure 2:
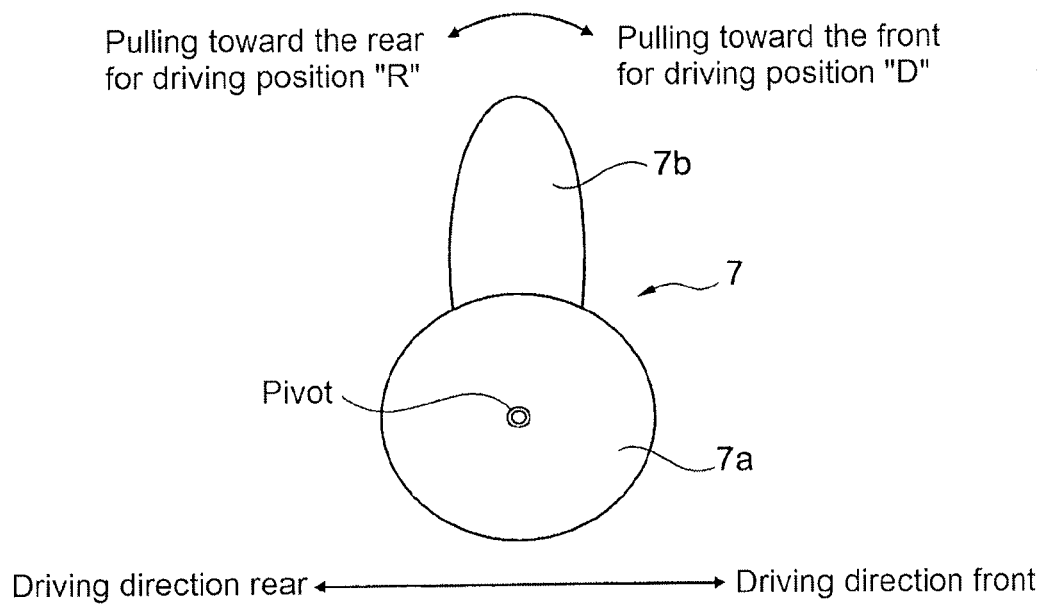
FIG. 2 is a schematic lateral view of a selector device according to an embodiment of the invention.

The selector device illustrated in FIG. 1 can be operated very intuitively. For engaging the drive (D) operating state, the driver only needs to pivot the selector element 7 toward the front, i.e. in the traveling direction (compare FIG. 2). For engaging the reverse (R) operating state, the driver only has to pivot the selector element 7 toward the rear against the traveling direction.

The selector element 7 can be designed as a monostable selector element. Monostable means that, after an actuation, the selector element 7 is automatically moved back into a predefined inoperative position by means of a restoring device.

It should also be noted that, for example, starting from the reverse operating state, direct shifting can take place into the drive (D) state. For this purpose, the driver only needs to press the selector element 7 toward the front in the traveling direction into a first pivoting position, in which the neutral state could be engaged, and further, beyond a pressure point, into a second pivoting position toward the front. Conversely, a shifting can also take place from the drive (D) state by pivoting the selector element 7 toward the rear, beyond a pressure point, directly into the operating state (R).

FIG. 2 again illustrates the above-explained operating logic.

Figure 3:
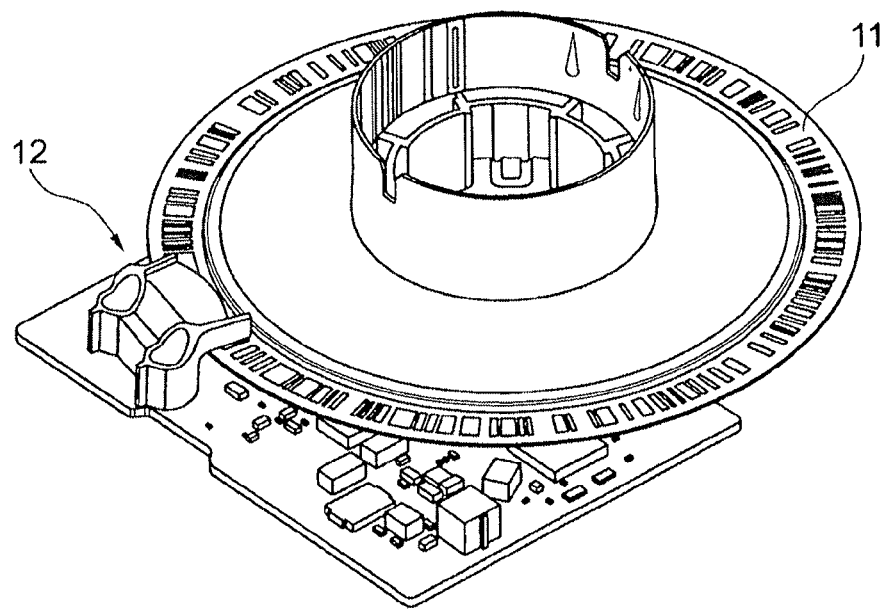
FIG. 3 is a view of a basic principle of a visual measuring sensor system for detecting the rotating or pivoting state of a selector element according to an embodiment of the invention.

FIG. 3 illustrates the basic principle of a sensor system, by which the rotating or pivoting state of the selector element 7 (compare FIG. 1) can be detected with respect to the selector element holder (9). For example, a slotted wheel 11 can be connected with the selector element 7. A visual detection device 12 detects the deflecting, rotating or pivoting angle of the slotted wheel 11, from which the rotating or pivoting state of the selector element 7 can be derived.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A vehicle, comprising:
a steering wheel rotatable about a steering axis;
a transmission;
a monostable selector device finger actuated to select different states of the transmission, wherein:
the selector device is arranged at a distance from the steering wheel on a side of the steering wheel facing away from the driver, and
the selector device comprises a tabular selector element rotatable about a rotation axis essentially transverse to the steering axis, wherein rotation of the selector element about the rotation axis actuates the selector device.

2. The vehicle according to claim 1, wherein the selector device is operatively configured to select drive, neutral and reverse operating states of the transmission.

3. The vehicle according to claim 1, wherein the selector element is rotatable in a first direction and in a second direction opposite the first direction.

4. The vehicle according to claim 1, wherein the selector element is arranged on a right side of the steering axis viewed in a traveling direction of the vehicle.

5. The vehicle according to claim 3, wherein the selector element is arranged on a right side of the steering axis viewed in a traveling direction of the vehicle.

6. The vehicle according to claim 5, wherein the selector element projects radially beyond a steering wheel rim of the steering wheel.

7. The vehicle according to claim 1, further comprising:
a selector element holder of the selector device, the sector element holder projecting essentially radially outward from a steering column covering that surrounds the steering axis; and
wherein the selector element is rotatably arranged on the selector element holder.

8. The vehicle according to claim 6, further comprising:
a selector element holder of the selector device, the holder projecting essentially radially outward from a steering column covering that surrounds the steering axis; and
wherein the selector element is rotatably arranged on the selector element holder.

9. The vehicle according to claim 1, wherein the selector element comprises a thickened section and an operating section that projects radially from the thickened section with respect to the rotation axis of the selector element, and wherein the operating section has operating surfaces.

10. The vehicle according to claim 9, wherein the operating section for selecting a drive operating state of the transmission is configured for rotation in the traveling direction of the vehicle, and
wherein the operating section for selecting a reverse operating state of the transmission is configured for rotation against the traveling direction.

11. The vehicle according to claim 7, further comprising:
a display device arranged on the selector element holder, the display device being operatively configured to display a currently selected operating state of the transmission.

12. The vehicle according to claim 1, further comprising:
a restoring device of the selector device, the restoring device being operatively configured to move the selector element back into a predefined inoperative position after being actuated.

13. The vehicle according to claim 1, wherein the selector device is operatively configured to be actuable via an actuating force of less than 10N.

14. The vehicle according to claim 12, wherein the selector element is movable against a restoring force of the restoring device starting from the inoperative position into a first actuating position.

15. The vehicle according to claim 14, wherein starting from the first actuating position, the selector device is further movable against a restoring force into a second actuating position.

16. The vehicle according to claim 15, further comprising a pressure point operatively arranged such that the pressure point must be overcome during a transition from the first actuating position to the second actuating position.

17. The vehicle according to claim 1, further comprising:
a sensor system operatively configured to detect a rotational state of the selector element with respect to an inoperative position; and
wherein the sensor system provides a corresponding signal to a transmission control device of the transmission.

18. The vehicle according to claim 17, further comprising a visual sensor as a component of the sensor system by which the rotational state is detected.

19. The vehicle according to claim 1, further comprising a transmission control device for controlling the transmission, wherein the selector device is electrically connected with the transmission control device.

20. The vehicle according to claim 1, wherein the steering axis defines a roll axis relative to which the rotation axis approximates a yaw axis.

* * * * *